United States Patent [19]

Mitsuhira et al.

[11] Patent Number: 5,561,816
[45] Date of Patent: Oct. 1, 1996

[54] DATA TRANSFER CONTROLLING DEVICE FOR USE IN A DIRECT MEMORY ACCESS (DMA) SYSTEM

[75] Inventors: Yuko Mitsuhira; Tsuyoshi Katayose, both of Tokyo, Japan

[73] Assignee: NEC Corporation, Tokyo, Japan

[21] Appl. No.: 3,851

[22] Filed: Jan. 11, 1993

Related U.S. Application Data

[63] Continuation of Ser. No. 704,244, May 22, 1991, abandoned.

[30] Foreign Application Priority Data

May 22, 1990 [JP] Japan ...................... 2-131820

[51] Int. Cl.⁶ .................................... G06F 13/28
[52] U.S. Cl. .................. 395/842; 395/846; 395/854; 395/855; 395/421.07; 364/DIG. 1; 364/242.3; 364/242.34; 364/251; 364/251.1
[58] Field of Search ........................... 395/275, 425, 395/775, 842, 844, 845, 846, 853, 854, 855, 375, 421.07, 421.08, 421.09, 421.1, 800

[56] References Cited

U.S. PATENT DOCUMENTS

| | | | |
|---|---|---|---|
| 4,346,439 | 8/1982 | Huno et al. ............................ | 395/842 |
| 4,723,223 | 2/1988 | Hanada ................................. | 395/846 |
| 4,797,809 | 1/1989 | Sato et al. ............................. | 395/846 |
| 5,081,622 | 1/1992 | Nassehi et al. ........................ | 370/85.2 |
| 5,214,645 | 5/1993 | Hagirahim ............................. | 370/85.1 |
| 5,247,671 | 9/1993 | Adkins et al. ......................... | 395/650 |
| 5,249,279 | 9/1993 | Schmenk et al. ..................... | 395/825 |
| 5,280,578 | 1/1994 | Kamiymama et al. ................ | 395/164 |
| 5,287,471 | 2/1994 | Katayose et al. ..................... | 395/842 |
| 5,347,634 | 9/1994 | Herrell et al. ......................... | 395/250 |

FOREIGN PATENT DOCUMENTS

| | | |
|---|---|---|
| 0013853 | 8/1980 | European Pat. Off. . |
| 0088982 | 9/1983 | European Pat. Off. . |
| 0165600 | 12/1985 | European Pat. Off. . |

*Primary Examiner*—Lance Leonard Barry
*Attorney, Agent, or Firm*—Sughrue, Mion, Zinn, Macpeak & Seas

[57] ABSTRACT

A data transfer controlling device of a direct memory access controller (DMAC) type includes a transfer number data storage, a transfer number updating decrementer, a data setter for setting predetermined initial data in the transfer number data storage, a terminal counter with a decrementer or an area counter with a decrementer, a memory address register, an address updating section, and a DMA execution control section. The number of times of transfer for the subsequent DMA transfer is automatically set when the number of DMA transfers to be successively executed in response to each DMA transfer request has been completed. Immediately thereafter, the DMA transfer is repeated in response to the subsequent DMA transfer request. When the DMA transfer has been completed to the final data in the DMA transfer source region of a memory, it is placed in an inhibited state. Thus, DMAC can respond to the DMA transfer request issued from a peripheral device at a high speed.

6 Claims, 9 Drawing Sheets

DATA TRANSFER CONTROLLING DEVICE FOR USE IN A DIRECT MEMORY ACCESS (DMA) SYSTEM

This is a Continuation of application Ser. No. 07/704,244 filed May 22, 1991, abandoned.

BACKGROUND OF THE INVENTION

The present invention relates to a data transfer controlling device for performing a data transfer between a memory and a peripheral device in a direct memory access (hereinafter referred to as "DMA") system.

In many cases, an information processing system using a microcomputer transfers a large amount of data between a peripheral device and a memory, processes the data by a central processing unit (CPU) and further transfers the processed data to another peripheral device and memory. For example, in a print control/processing system, a CPU receives data from a host computer, processes the received data and transfers the processed data to a printing device at the rate of the data of one character in response to one transfer request from the printing device. In this case, if the above data transfer is executed in an interruption routine in accordance with an interruption request from a peripheral device (e.g., printing device) to the CPU, overhead (time taken for the interruption processing) of the CPU will increase thereby to reduce the efficiency of data processing in the system. In order to obviate such inconvenience, a direct memory access controller (hereinafter referred to as "DMAC") has been proposed as a data transfer controlling device dedicated to controlling the data transfer.

The data transfer using DMAC (hereinafter referred to as "DMA transfer") is carried out as follows. First, several kinds of items of information such as a memory address for which the data transfer is to be made and the number of DMA transfers are previously set in DMAC by means of an instruction execution by CPU. When DMAC detects a request of DMA transfer sent from a peripheral device such as a printing device and a display device, it requests CPU for the privilege of using a bus. When CPU detects this request, it delivers the privilege of using the bus including an address bus and a data bus to DMAC. Using the delivered bus, DMAC produces an item of address information and a read/write signal to transfer the data stored in a memory to the peripheral device which requested the DMA transfer.

Thereafter, the requested number of DMA transfers (e.g., corresponding one character to be printed) will be repeated. When such data transfer is completed, DMAC informs the CPU of completion of the DMA transfer requested. When CPU detects the completion of the DMA transfer, it executes an interruption processing and an interruption processing program routine. In the interruption processing program routine, CPU resets several kinds of control information for DMAC for preparation of the subsequent DMA transfer. Thus, the DMA transfer will be carried out again.

Now, referring to the drawings, explanation will be given of data transfer from a memory to a peripheral device using the conventional DMAC.

FIG. 1 is a block diagram showing the main part of a conventional information processing system 500.

The information processing system 500 is composed of a microcomputer 501 including a CPU 511 and a DMAC 512, a memory 503 and a peripheral device 502.

CPU 511 incorporates a program counter (PC), a program status word (PSW), several kinds of registers. Using them, CPU 511 controls the operation of the entire information processing system 500, including controlling the execution of several kinds of instructions, and controlling the privilege of using a bus 505 through which an address signal, data, and a read/right signal are passed.

DMAC 512 is composed of at least one set of a memory address register (MAR) 513 for storing the address information to be subjected to the DMA transfer, a terminal counter (TC) 514 for storing the number of data to be transferred and a terminal counter modulo register (TCM) 515 for storing an initial value of the number of data to be transferred. Prior to starting the DMA transfer, CPU 511 previously sets in MAR 513 the address for which the DMA transfer is to be started and sets in TC 514 and TCM 515 the number of data to be transferred in response to each DMA transfer request made. When DMAC 512 detects the signal 520 of requesting the DMA transfer supplied from the peripheral device 502, it acquires the privilege of using the bus 505 from CPU 511 through an exchange of a bus hold requesting signal (HLDRQ) which requests CPU to hold the privilege of using the bus 505 and a hold acknowledge signal (HLDAK) which permits DMAC 512 to use the bus 505, and then executes the DMA transfer between the memory 503 and the peripheral device 502.

Memory 503 is composed of a program region for CPU 511, a data area, a DMA transfer source region A 530 and a DMA transfer source region B 531, and stores, under the control by CPU 511 or DMAC 512, several kinds of data for the information processing system 500 through the bus 505 through which an address signal, data and a read/write signal are passed. In operation, prior to starting the DMA transfer, CPU 511 writes the data to be DMA-transferred in the DMA transfer source region A 530. Upon completion of write of final data in the DMA transfer source region A 530, CPU 511 permits executing the DMA transfer for the DMA transfer source region A 530. Then, DMAC 512 burst-transfers (or collectively transfers) the data stored in the DMA transfer source region A 530 to the peripheral device 502. It should be noted that during the period other than execution of the DMA transfer for the DMA transfer source region A 530, CPU 511 writes the DMA-transfer data in the DMA transfer source region B 531. After DMAC 512 completes the DMA transfer to the final data for the source region A 530, it will execute the DMA transfer in the source region B 531 if the data to the final data have been stored in the region B 531. Thus, the DMA transfer source regions A 530 and B 531 will be alternately subjected to the DMA transfer by DMAC 512 or the storage by CPU 511.

Detailed explanation will be given of the DMA transfer operation between the memory 503 and the peripheral device 502.

When the necessity arises for the peripheral device 502 to receive the data to be DMA-transferred corresponding to the number of times set in TC 514, the peripheral device 502 activates the DMA transfer requesting signal 520 to supply it to DMAC 512. In response to activation of the DMA transfer requesting signal 520, DMAC 512 activates the HLDRQ signal 522 to require CPU 511 to hold the privilege of using the bus 505.

Meanwhile, CPU 511 executes a predetermined program processing including creating data and storing the created data in the DMA transfer source region A 530 and also always monitors the status of the HLDRQ signal 522 supplied from DMAC 512. Now, when CPU 511 detects activation of the HLDRQ signal 522, with the contents of PC, PSW and several kinds of registers being held at their values during program execution, it activates the HLDAK signal 523 to inform DMAC 512 of having given the bus using privilege.

DMAC 512 which has acquired the bus using privilege sends the address information for the DMA transfer in the DMA transfer source region A 530 to the bus (address bus) 505, and also activates the memory read signal to send the transferred data onto the bus 505. Subsequently, DMAC 512 activates the memory write signal (or DMA acknowledge signal) 521 to write the DMA-transferred data in the peripheral device 502.

Each time the DMA transfer has been made, the content of the memory address register MAR 513 is updated, and the content of the terminal counter TC 514 which stores the number of transfer data is decremented by "1". DMAC 512 repeats the above DMA transfer. When DMAC 512 completes the DMA transfer by the predetermined number of times (the content of TC 514 has been decremented to "0"), it makes the HLDRQ signal 522 inactive so as to inform CPU 511 of aborting the bus using privilege. Thus, CPU 511 takes back the bus using privilege and resumes the program execution. Further, DMAC 512 presets the value of the terminal counter modulo register TCM 515 into the terminal counter TC 514 to initialize TC 514 in preparation for the subsequent request of the DMA transfer, and activates a DMA interruption requesting signal 524 to inform CPU 511 of the completion of the DMA transfer.

When CPU 511 receives the signal 524 from DMAC 512, it saves PC and PSW toward a stack area, and starts the interruption processing program routine. In this program routine, for example, as seen from the flowchart of FIG. 3, in order to prevent the data stored in the memory region other than the DMA transfer source regions from being DMA-transferred, the number of interruptions that have occurred (the number of times when TC has been decremented to "0") is counted. And, when the number of times becomes a predetermined value, a decision that the data transfer has been carried out to the final data in the DMA transfer source regions is made. On the basis of this decision, the DMA transfer is inhibited by resetting a transfer permission bit, for example. Further, the DMA transfer starting address of the DMA transfer source region B 531 is set in MAR 513. If, at this time, writing the data to be transferred to its final data in the DMA transfer source region B 531 has been completed by CPU 511, the process of permitting the DMA transfer for the source region B 531 is made. Upon completion of executing the interruption processing routine, CPU 511 recovers PC and PSW from the stack area.

The information processing system using the prior art DMA transfer controlling method and apparatus hitherto explained has the following defects.

As seen from FIG. 4, upon completion of a predetermined number of times of the DMA transfer in the above information processing system, CPU 511 executes an interruption process of saving PS and PSW to a stack region and recovering them therefrom, and also an interruption program process such as examining if the DMA transfer for the DMA transfer source region has been completed to its final data and if completed, inhibiting the DMA transfer (① in FIG. 4). While the interruption process and the interruption program process are being executed, DMAC 512 must hold the DMA transfer request issued from the peripheral device (③ in FIG. 4). Specifically, the DMA transfer request must be held for a long time (the time required to respond to the DMA transfer request) from the issuance of the request to the actual execution of the DMA transfer. Further, CPU deals with the process relating to the DMA transfer for a long time, so that it cannot execute the inherent process at a high speed. Particularly, this is remarkable in a print control process system. Namely, in this system, the number of times of transfer responding to each DMA transfer request can be set for the number of bytes corresponding to one character data to be printed (3 bytes if one character is composed of 24×24 dots). Thus, the DMA transfer interruption process must be executed very frequently.

Further, upon completion of the DMA transfer to the final data for the DMA transfer source area, CPU inhibits the DMA transfer and this inhibition is done within the interruption process. Therefore, if the subsequent DMA transfer request is issued during the period until the inhibiting time ((④ in FIG. 4), DMAC will DMA-transfer the data existing in the memory region other than the DMA transfer source areas.

SUMMARY OF THE INVENTION

An object of the present invention is to provide a data transfer controlling device which can respond to DMA transfers at a high speed.

Another object of the present invention is to provide a data transfer controlling device which can effectively use hardware resources.

In accordance with one aspect of the present invention, there is provided a data transfer controlling device which performs the data transfer between a memory having a DMA transfer source region and a peripheral device in a direct memory access (DMA) system, characterized by comprising:

a transfer number storing means for storing the number of times of DMA transfer to be successively executed in response to each DMA transfer request;

a transfer number updating means for updating the value of the transfer number storing means at each execution of the DMA transfer;

a data setting means for setting predetermined data in the transfer number storing means when it is updated to a predetermined value;

a counter means for storing the value relating to the data which have not yet been DMA-transferred of the data stored in the DMA transfer source region;

a counter updating means for updating the value of the counter means;

an address storing means for storing addresses of the DMA transfer source region;

an address updating means for updating the value of the address storing means at each execution of the DMA transfer;

a detecting means for detecting whether the DMA transfer has been executed to the final data in the DMA transfer source region; and a DMA execution control means for stopping the DMA transfer on the basis of the result of such detection.

In accordance with another aspect of the present invention, there is provided, instead of the terminal counter, an area counter for storing the number of times of repeating of the DMA transfer to be successively executed.

BRIEF DESCRIPTION OF THE DRAWINGS

The above and other objects, features and advantages of the present invention will be apparent from the following detailed description of the preferred embodiments of the invention taken in conjunction with the accompanying drawings, in which.

DESCRIPTION OF THE PREFERRED EMBODIMENTS

Figure 1:
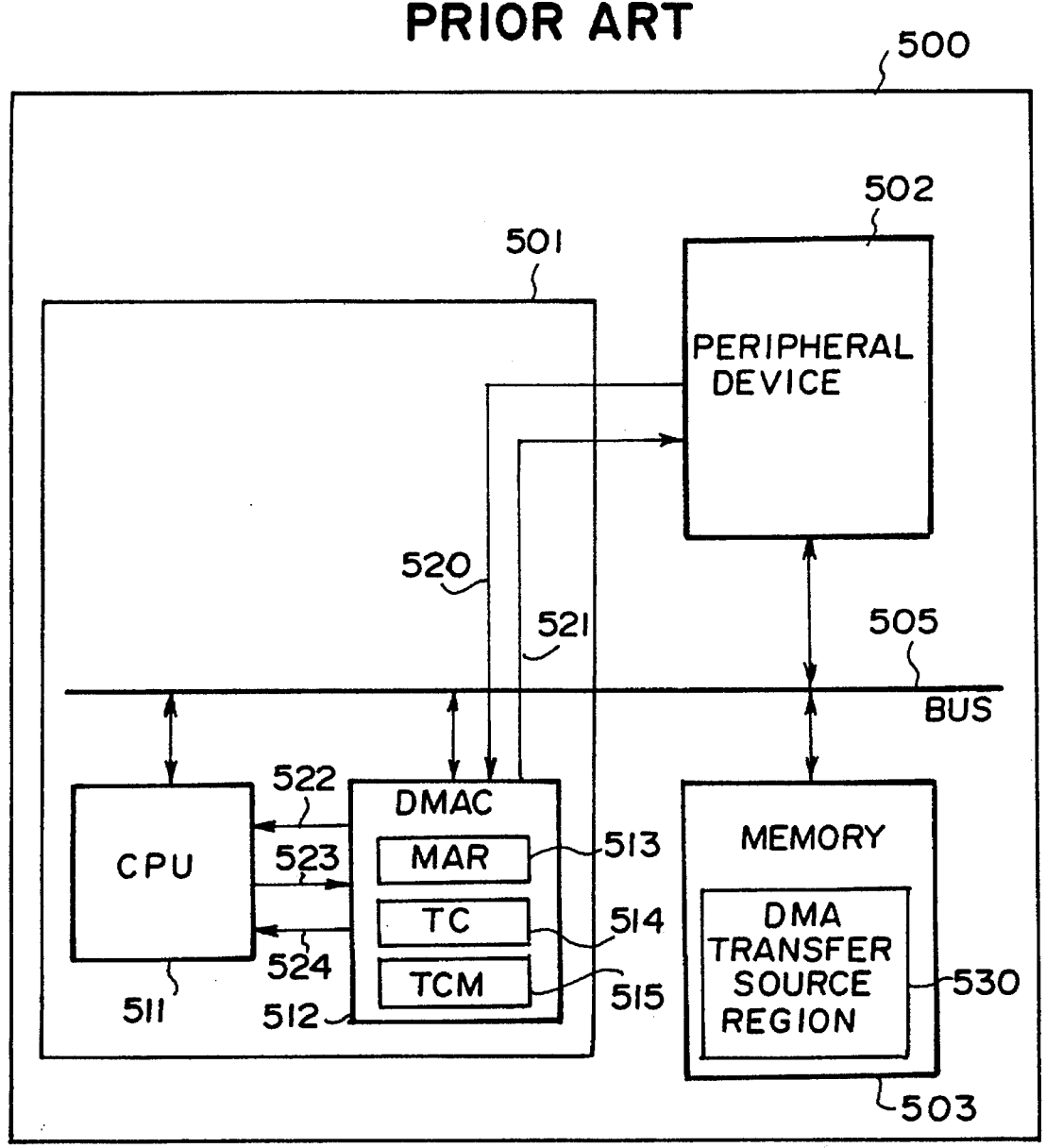
FIG. 1 is an information processing system incorporating the conventional DMAC.
Figure 2:
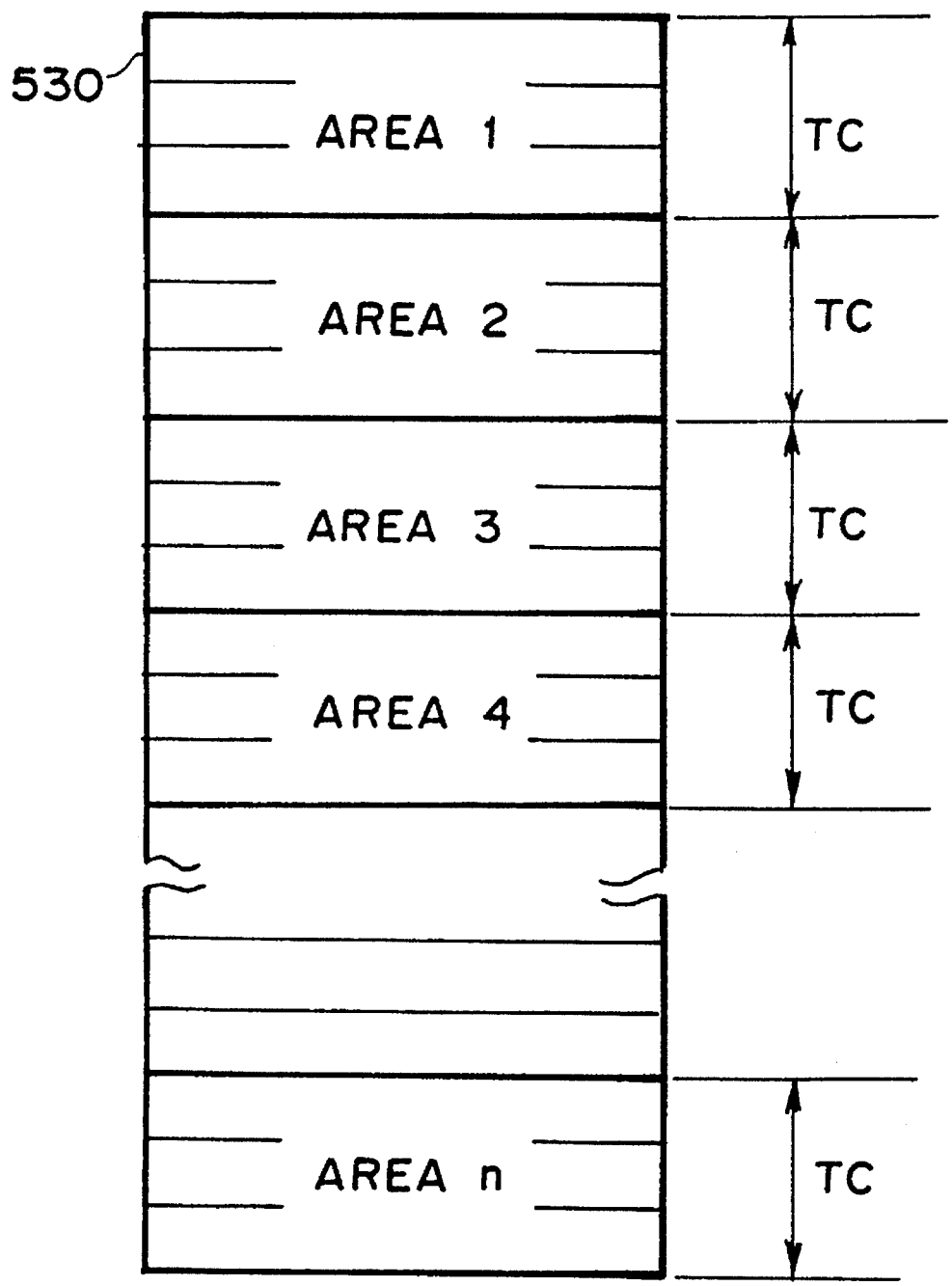
FIG. 2 is a memory map of the conventional DMA transfer source region.
Figure 3:
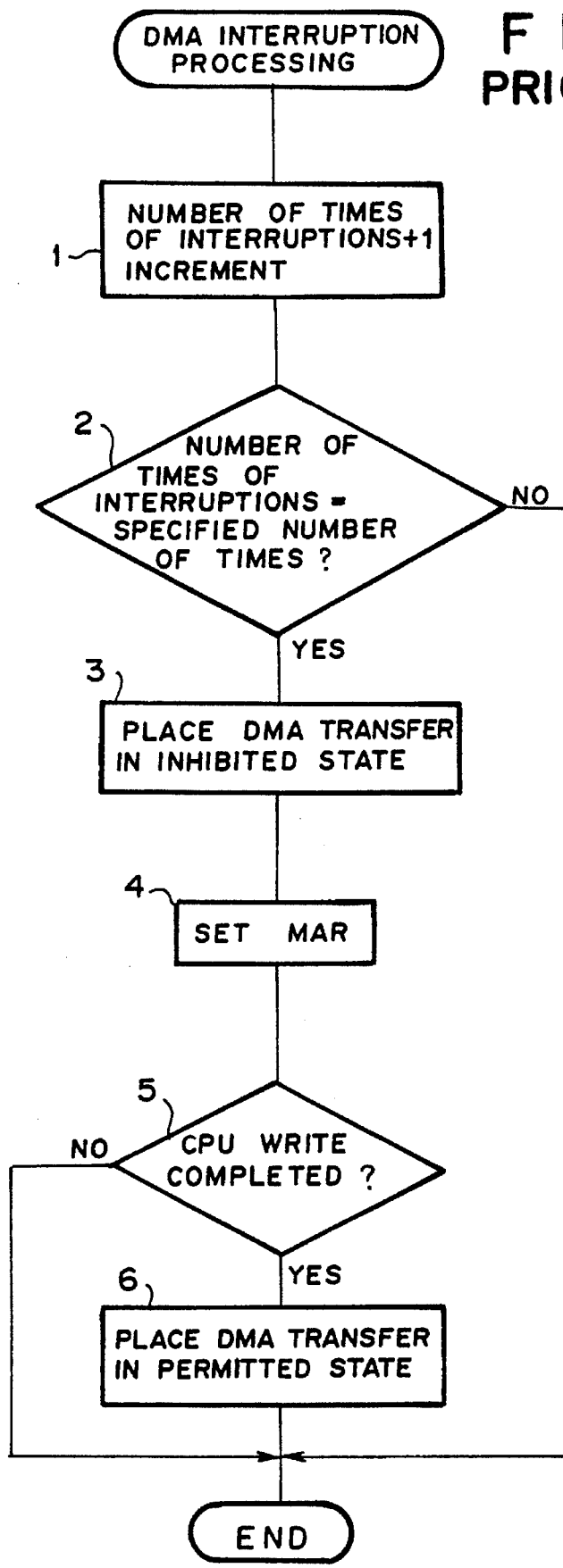
FIG. 3 is a flowchart of the processing of CPU in the conventional DMA transfer.
Figure 4:
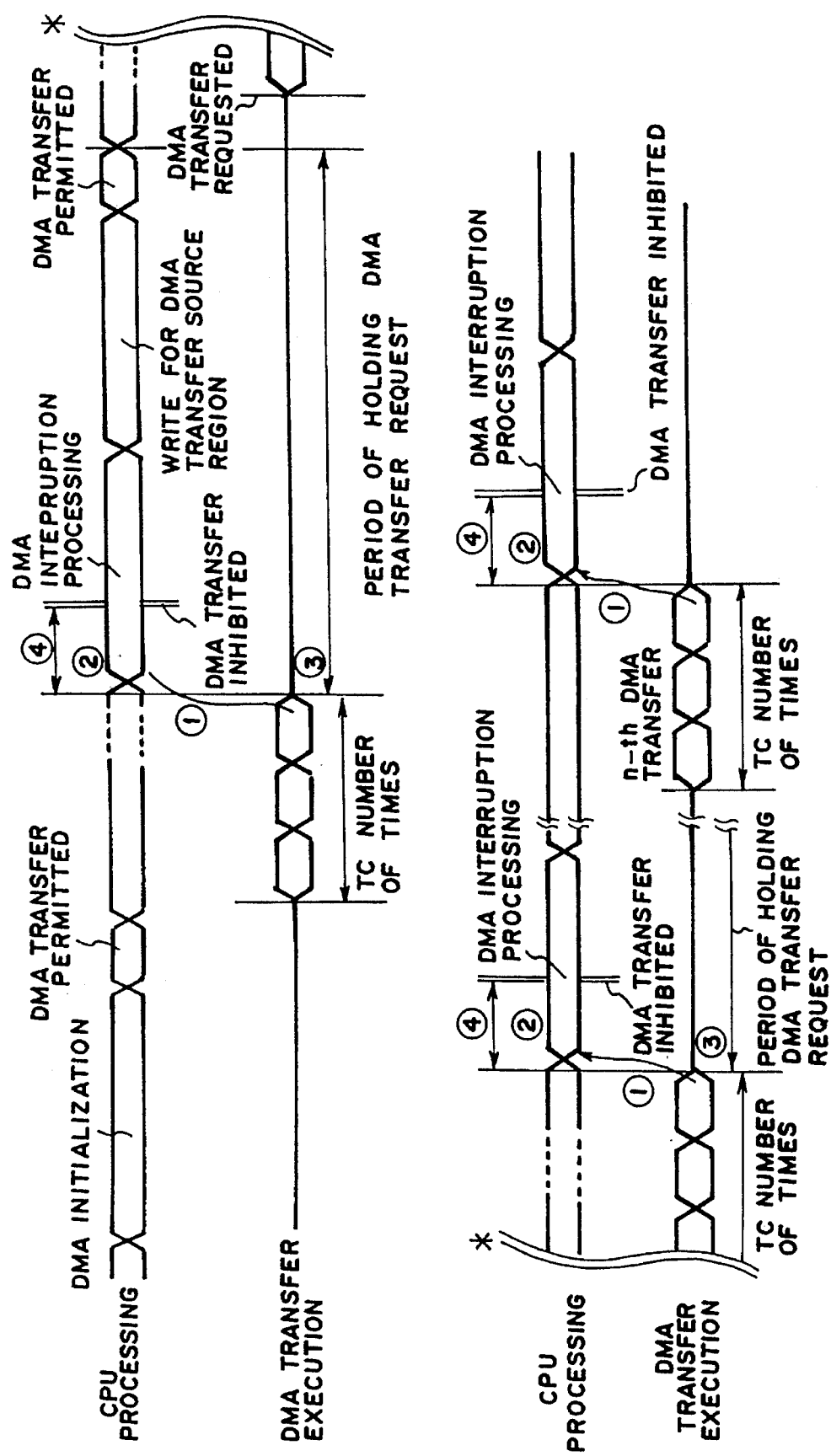
FIG. 4 is a sequence diagram of the processing of CPU and DMA transfer in the prior art.

Now, referring to the drawings, explanation will be given of embodiments of the data transfer controlling device according to the present invention.

Figure 5:
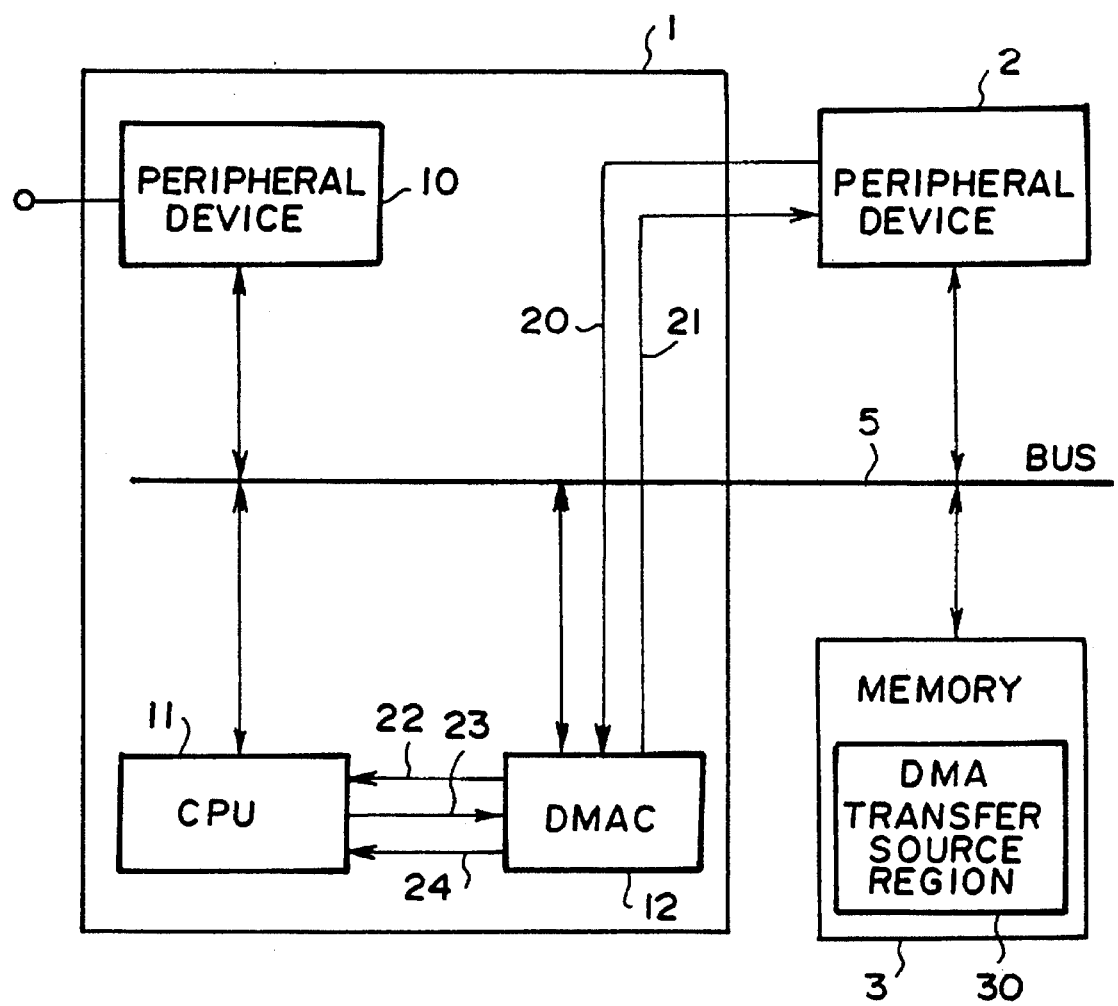
FIG. 5 is a block diagram of an information processing system incorporating a DMAC according to a first embodiment of the present invention.
Figure 6:
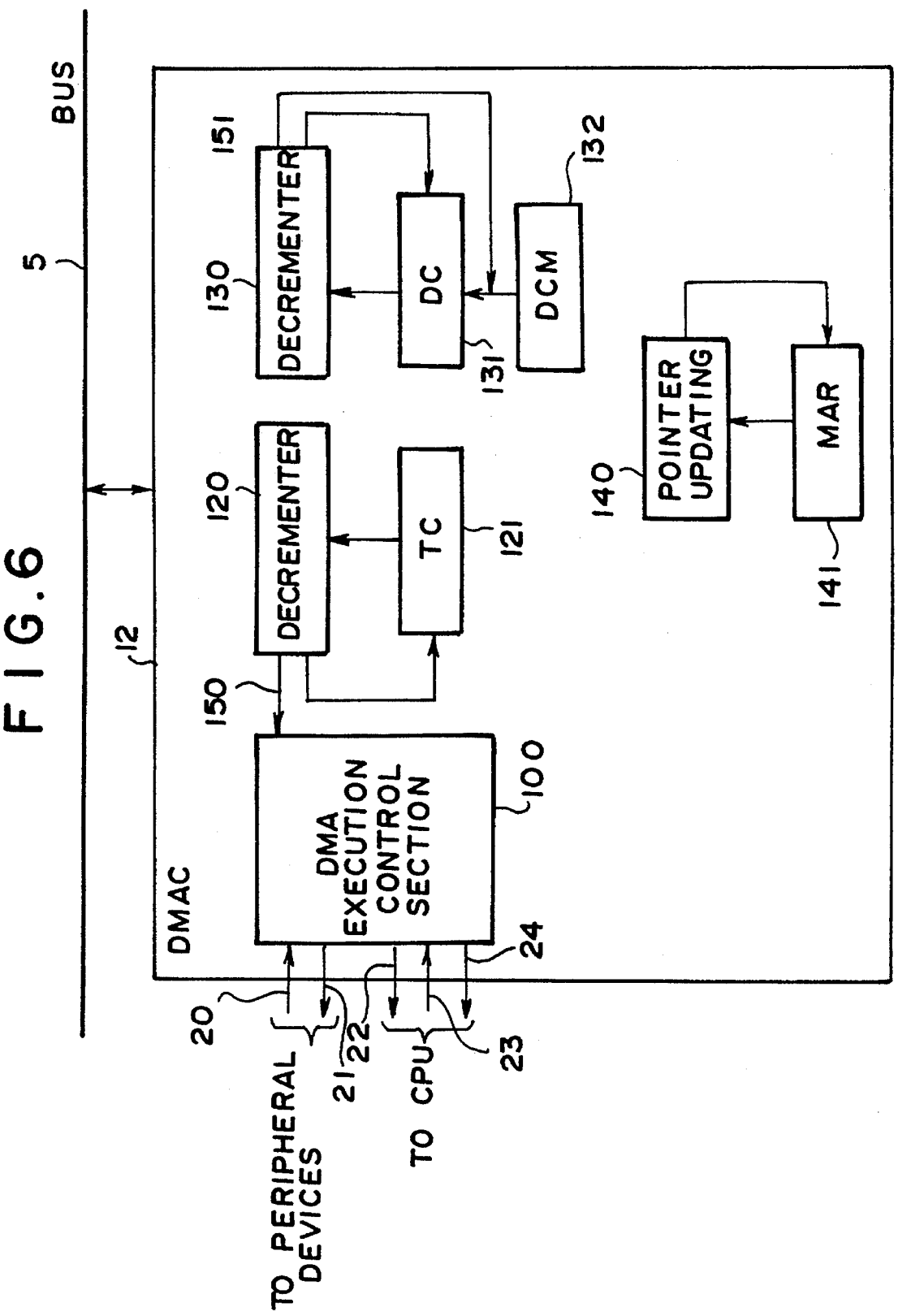
FIG. 6 is a block diagram of the main part of the DMAC according the first embodiment of the present invention.

FIG. 5 shows an arrangement of the information processing system provided with a microcomputer 1 incorporating a DMAC 12 which is a data transfer controlling device according to the present invention. FIG. 6 shows an arrangement of the main part of DMAC 12 shown in FIG. 5. Microcomputer 1 comprises a central processing unit (CPU) 11, a peripheral device 10 (e.g., data receiving control circuit), and DMAC 12 which is a data processing device for controlling the data transfer between a peripheral device 2 and a memory 3.

Microcomputer 1 serves to control the entire information processing system. For example, CPU 10 processes the data received through peripheral device 10 and, stores the processed data in a DMA transfer source region A 30 or B 31 located in memory 3, and DMAC 12 transfers the data stored in the source region A 30 or B 31 to another peripheral device 2 (e.g., printer control device).

Peripheral device 2 is provided with a buffer for read/write of data. It executes the processing inherent to the peripheral device such as a print processing and display processing on the basis of the data sent to the buffer by DMAC 12.

Memory 3 is composed of a program region for CPU 11, a data region, and DMA transfer source regions A 30 and B 30, which are two parts into which a DMA transfer region is divided. Memory 3 stores several kinds of data for the information processing system through a bus 5 under the control of CPU 11 or DMAC 12.

CPU 11 within microcomputer 1 incorporates PC, PSW, several kinds of control registers, and serves to control execution of several kinds of instructions and the privilege of using a bus through which an address signal, data, and read/write signal may pass.

As shown in FIG. 6, DMAC 12 within microcomputer 1 is composed of a memory address register (MAR) 141 for storing the address information for DMA transfer in DMA transfer source region A 30 or B 31, a pointer updating section 140 for updating the content of MAR 141, a down counter modulo register (DCM) 132 for setting the number of times (initial value) of the DMA transfer to be successively executed in response to each DMA transfer request issued from peripheral device 2, a down counter (DC) 131 for storing the number of data which are not yet DMA-transferred of the data to be DMA-transferred in response to the DMA transfer request issued from the peripheral device 2, a decrementer 130 for decrementing the content of DC 131, a terminal counter (TC) 121 for storing the number of data which are not yet DMA-transferred of the data stored in DMA transfer source region A 30 or B31, a decrementer 120 for decrementing the content of TC 121, and an execution control section 100 for making the control of the entire DMAC which includes controls of the privilege of using the bus 5 which is to be selectively given to itself or CPU 11, transfer timings during the DMA transfer and updating internal registers.

Figure 9:
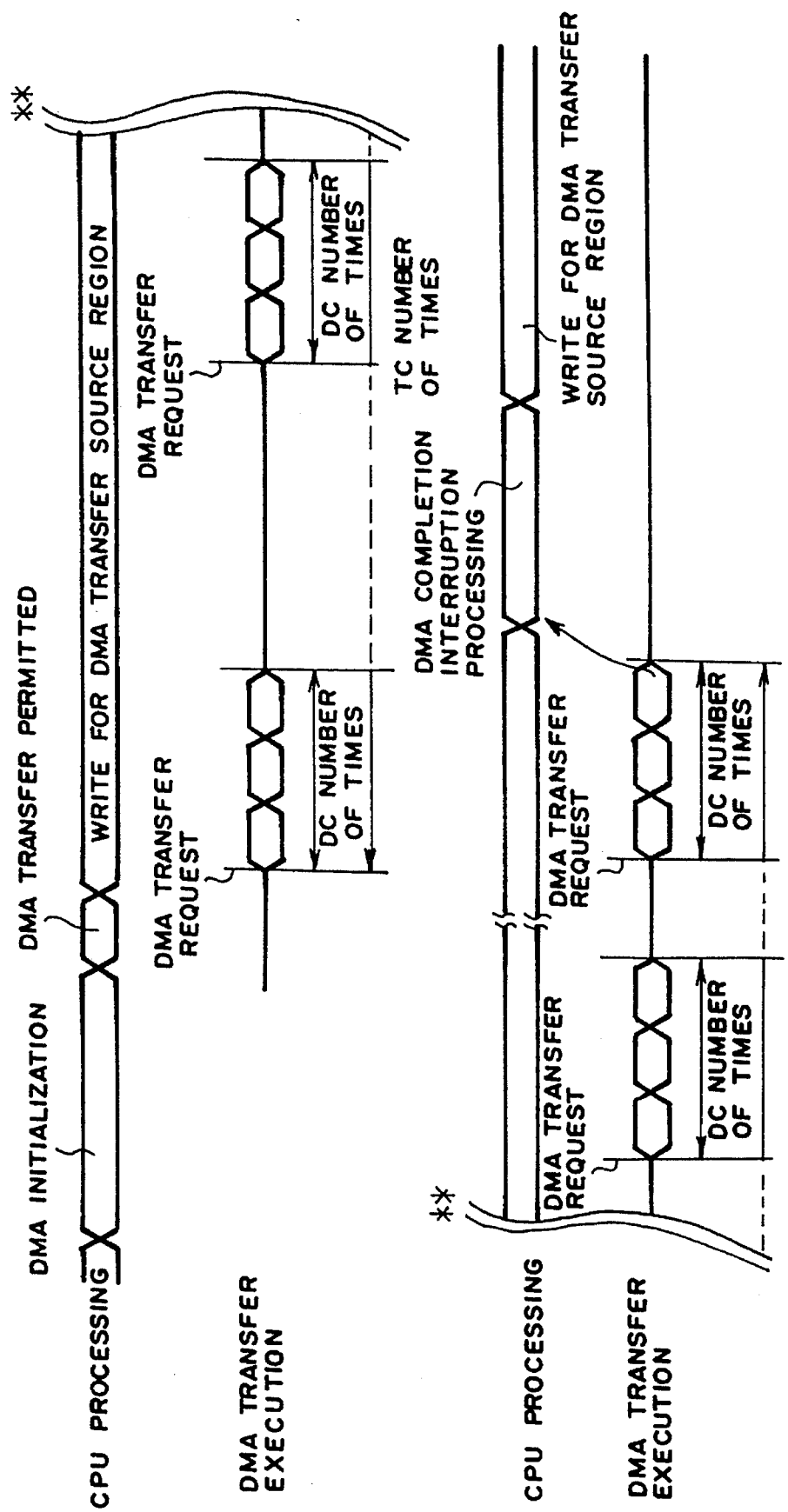
FIG. 9 is a sequence diagram of the processing of CPU and DMA transfer in the embodiments of the present invention.

Now, referring to FIGS. 7 and 9, explanation will be given of the software processing on the side of CPU 11 in transferring data from memory 3 to peripheral device 2.

Figure 7:
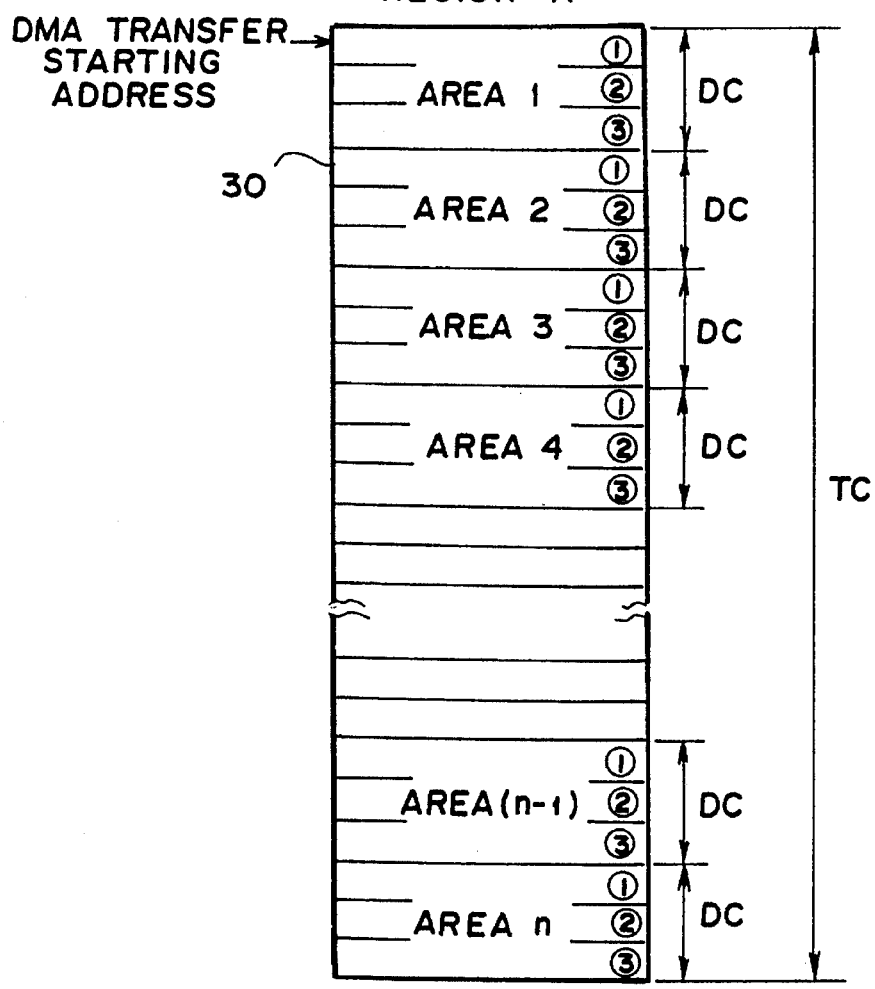
FIG. 7 is a memory map of DMA transfer source regions in the first embodiment according to the present invention.
Figure 7:
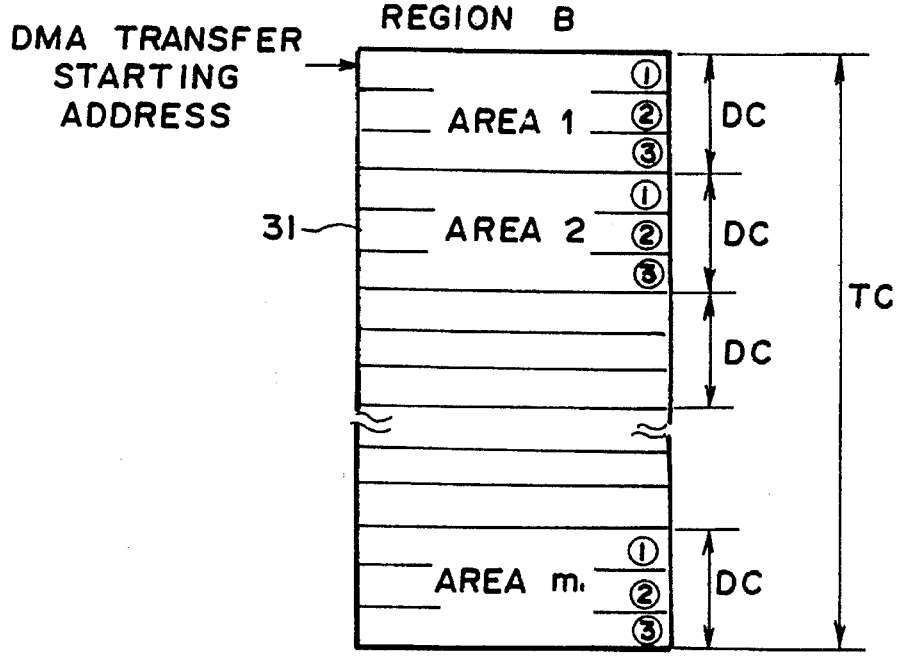

As shown in FIG. 7, DMA transfer source regions A30 and B31 are divided into several areas each including the number of data to be successively DMA-transferred in response to each DMA transfer request issued from peripheral device 2. Specifically, DMA transfer source region A 30 consists of an area 1 which is to be successively subjected to the DMA transfer in response to the first DMA transfer request, an area 2 which is to be successively subjected to the DMA-transfer in response to the second DMA transfer request, . . . and an area n which is to be successively subjected to the n-th DMA transfer request. DMA transfer source region B 31 also consists of an area 1 which is to be successively subjected to the DMA transfer in response to the first DMA transfer request, an area 2 which is to be successively subjected to the DMA-transfer in response to the second DMA transfer request, . . . and an area m which is to be successively subjected to the m-th DMA transfer request. Before DMAC 12 starts the DMA transfer, CPU 11 processes the data received through the peripheral device 10, and writes the processed data in DMA transfer source region A 30. CPU 11, after having written the final data (+e,fra 3+ee in the area n) in DMA transfer source region A 30 initializes in MAR 141 a DMA transfer starting address for the DMA transfer source region A 30, in DC 131 and DCM 132 the number ("4" in FIG. 7) of data to be successively DMA-transferred in response to one DMA transfer request issued from peripheral device 2, and in TC 121 the number of data ("4n" which is n times of the number of data set in DC 131 in FIG. 7) stored in DMA transfer source region A 30. Thereafter, CPU 11 places the DMA transfer in a transfer permissible state by setting a transfer permission bit, for example. Thus, DMAC 12 starts the DMA transfer during which the data stored in DMA transfer source region A 30 will be burst-transferred (or collectively transferred) to peripheral device 2 in the number of data set in DC 131. Additionally, CPU 11, after having placed the DMA transfer in a permissible state, will write the processed data in DMA transfer source region B 31.

A detailed explanation will be given of the DMA transfer from DMA transfer region A 30 to peripheral device 2 by DMAC 12.

When the necessity occurs for the peripheral device 2 to receive the DMA transferred data corresponding to the number of data set in DC 131, the peripheral device 2 activates a DMA transfer request signal 20 for DMA transfer execution control section 100. When the DMA transfer request signal 20 is activated, DMA transfer execution control section 100 acquires the bus using privilege from CPU 11 through an exchange of an HLDRQ (signal) 22 and HLDAK (signal) 23 as described in connection with the prior art.

In the DMA transfer in which data are transferred from DMA transfer source region A 30 to peripheral device 2, DMAC 12 issues the address information (the address of ① in area 1 in FIG. 7) for the DMA transfer indicated by MAR 141 to the bus 5 to read the data-to-be-transferred from DMA transfer region A30 on the bus 5, and also supplies an acknowledge signal 21 to peripheral device 2. In response to the acknowledge signal supplied, peripheral device 2 takes in the transferred data.

The content of DC 131 is read and decremented by "1" by decrementer 130 for each execution of the above DMA transfer, and thereafter the decremented value by "1" is rewritten in DC 131. The content of TC 121 is read and decremented by "1" by decrementer 120, and thereafter the decremented value is rewritten in TC 121. Further, for each execution of the DMA transfer, the content of MAR 141 is read and updated to the subsequent address (the address of ② of area 1 in FIG. 7) for the DMA transfer by the pointer updating section 140, and thereafter the updated value is rewritten in MAR 141. Therefore, DMAC 12 DMA-transfers the data stored in ② of area 1 indicated by updated MAR 141. Thereafter, DMAC 12 DMA-transfers the data stored in ③ of area 1 in the same manner. When DMAC 12 has completed the DMA-transfer of the data stored in ③ in area 1, namely, the content of DC 131 has been decremented to "0" (DC=0) by decrementer 130, a DC-zero detecting signal 151 is activated so that the value of DCM 132 is preset in DC 131. Then, if the DMA transfer request signal 20 has been successively issued from peripheral device 2, the above DMA transfer will be successively executed for area 2 in the same manner as for area 1. On the other hand, if not, DMA transfer execution control section 100 makes the HLDRQ signal 22 inactive to inform CPU 11 of having aborted the bus using privilege, thus completing the DMA transfer.

As described above, for each activation of the DMA transfer request signal 20, the DMA transfer will be repeated for the number of times initialized in DC 131. If TC 121 is decremented to "0", namely the DMA transfer is executed to the data stored in area n, a TC-zero signal 150 will be activated. DMA transfer execution section 100 receives this signal to detect that all the data stored in the DMA transfer source region A 30 has been DMA-transferred. Then, DMA transfer execution control section 100 activates a DMA interruption request signal 24 for CPU 11 and also places the DMA transfer in an inhibited state.

CPU 11, in an interruption processing program routine started owing to activation of the DMA transfer request signal 24, sets in MAR 141 the DMA transfer starting address for DMA transfer source region B 31. Then, if the data to be DMA-transferred has been stored to reach the final data in the DMA transfer source region B 31 by CPU 11, the DMA transfer is placed in a permitted state. Thus, the same DMA transfer as for the DMA transfer source region A 30 will be executed for the DMA transfer source region B 31 starting from its area 1.

The above processing is repeated so that the DMA transfer will be executed in such a manner that it is executed by the number of times set in DC 131 in response to each DMA transfer request and also when all the data stored in either one of the DMA transfer source regions A 30 and B 31 has been DMA-transferred, the DMA transfer is started for the other source region.

Figure 8:
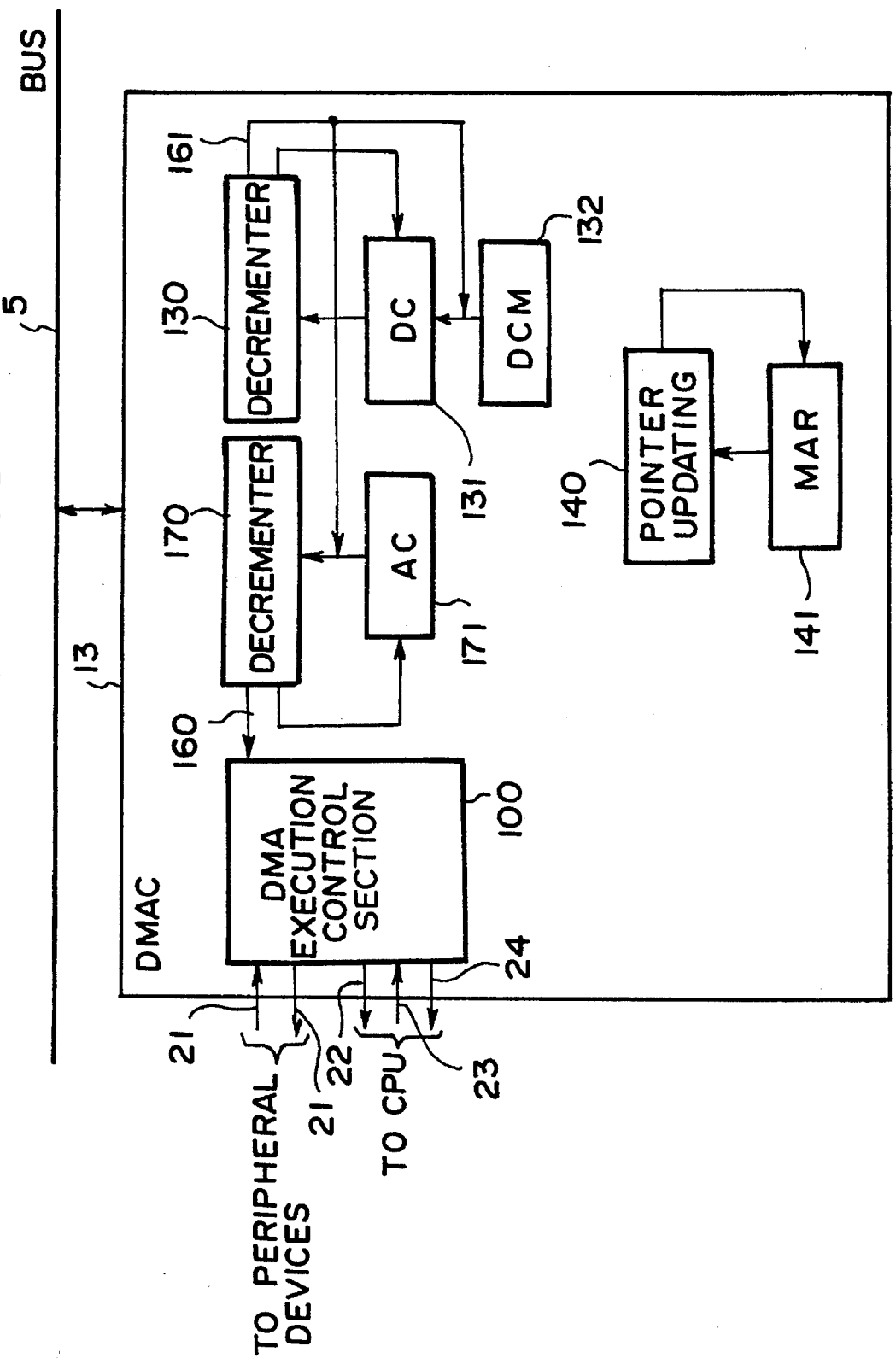
FIG. 8 is a block diagram of the main part of DMAC in a second embodiment of the present invention.

Now referring to FIG. 8, an explanation will be given of the second embodiment of the present invention. Since the arrangement of the second embodiment is substantially the same as that of the first embodiment, only the components which are different from those of the first embodiment will be explained.

In the second embodiment, an area counter (AC) 171 is provided instead of terminal counter TC 121 in the first embodiment. AC 171 serves to store the number of areas which have not yet been subjected to DMA-transfer of the data. DMA transfer source region in this embodiment is divided in to several areas each area for the number of data to be successively DMA-transferred as a unit in response to each DMA transfer request.

CPU 11 initializes AC 171 before the DMA transfer for the DMA transfer source region A 30 is started. The DMA transfer is started in response to activation of the DMA transfer request signal 20 as in the first embodiment. When the value of DC 131 has been decremented to zero, i.e., the DMA transfer has been completed for one area, a DC-zero detecting signal 161 is activated. In response to this signal, the content of AC 171 is read out and decremented by "1" by a decrementer 170 and then the decremented value is rewritten in AC 171. Thus, whenever DC 131 is decremented to zero, the content of AC 171 will be decremented by "1". When AC 171 is decremented to zero finally, an AC-zero detecting signal 160 is activated. DMA transfer execution control section 100 receives this signal to detect that the DMA transfer for DMA transfer source region A 30 has been completed. Then, control section 100 activates the DMA interruption signal 24 for CPU 11 and also places the DMA transfer in an inhibited state.

In this way, in this second embodiment, the number of areas which have not yet been subjected to DMA-transfer is set in AC 171. For this reason, even if the size of a DMA transfer source region is increased, it is not necessary to increase the number of bits to be set in AC 171 to the number of bits corresponding to the size of the DMA transfer source region. Thus, the circuit arrangement required can be minimized.

Additionally, it should be noted that, although in the first and the second embodiment, the address information for DMA transfer was prepared by directly updating MAR 141, it can be prepared by making an addition or subtraction for MAR 141 and TC 121 in the arrangement similar to the present invention.

As understood from the description hitherto made, in the DMAC according to the present invention, the number of times of transfer for the subsequent DMA transfer is automatically set when the DMA transfers to be successively executed in response to each DMA transfer request have been completed. Immediately thereafter, the DMA transfer is repeated in response to the subsequent DMA transfer request. When the DMA transfer has been completed to the final data in the DMA transfer source region, it is placed in an inhibited state. For this reason, it is not necessary to start the interruption processing for each completion of the DMA transfer of the number of times to be executed in response to each DMA transfer request and to cause CPU to perform the processing of inhibiting the DMA transfer during the interruption processing program routine. For example, in the case where the DMA transfer is to be executed for the DMA transfer region divided into n areas, the prior art must perform n number of times of interruption processing whereas the present invention has only to perform the interruption processing once. Thus, in accordance with the present invention, the processing efficiency of CPU can be improved and also the DMA transfer request which must be held during the CPU processing in the prior art is not required to be held, thereby permitting DMAC to respond to the DMA transfer request issued from a peripheral device at a high speed (see FIG. 9).

Further, in the prior art, if the subsequent DMA transfer request is issued during the period from completion of the DMA transfer in the DMA transfer source region to inhibition of the DMA transfer in the interruption program routine, the data stored in the memory area other than the DMA transfer source region will be DMA-transferred. On the other hand, in the present invention, the DMA transfer is inhibited immediately after the completion of the transfer to the final data stored in the DMA transfer source region. Therefore, the above difficulty involved with the prior art will not occur.

While the invention has been described in its preferred embodiments, it is to be understood that the words which have been used are words of description rather than limitation and that changes within the purview of the appended claims may be made without departing from the true scope and spirit of tile invention in its broader aspects.

What is claimed is:

1. A data transfer controlling device which performs, in response to a plurality of direct memory access (DMA) requests after an initial DMA request, data transfer between a memory having a DMA transfer source region and a peripheral device in a DMA system, said memory storing in said source region data received from an external system central processing unit (CPU) as a result of CPU processing, said data transfer controlling device comprising:

a transfer number storing means for storing a value specifying the number of DMA transfers to be executed in response to each DMA transfer request of said plurality of DMA requests;

a transfer number updating means for changing the value stored in said transfer number storing means after each execution of a DMA transfer of the plurality of DMA requests;

a data setting means for automatically resetting the value stored in said transfer number storing means after each DMA transfer request of said plurality of DMA requests is made to allow processing of a subsequent DMA transfer request without interruption of CPU processing;

a terminal counter means for storing a value relating to the amount of data which have not yet been DMA-transferred of the data stored in said DMA transfer source region;

a terminal counter updating means for automatically updating the value stored in said counter means;

an address storing means for storing an address value specifying data stored in said DMA transfer source region;

an address updating means for automatically updating the value of said address storing means after each execution of a DMA transfer;

a detecting means for detecting whether all of the data stored in the DMA transfer source region has been transferred; and a DMA execution control means for stopping DMA transfer on the basis of the result of such detection by said detecting means, wherein, after the initial DMA request, the DMA transfers responsive to said plurality of DMA requests are performed automatically and without interruption of CPU processing.

2. A data transfer controlling device according to claim 1, wherein said DMA transfer source region is composed of a plurality of areas, each area storing at least one block of data for DMA transfer in response to a DMA transfer request, said terminal counter means being an area counter for storing a value corresponding to the number of areas storing data to be DMA transferred and said counter updating means being an area counting updating means for changing the value stored in said area counter.

3. A data transfer controlling device which performs, in response to a plurality of direct memory access (DMA) requests after an initial DMA request, data transfer between a memory having a DMA transfer source region and a peripheral device in a DMA system, said memory storing in said source region data received from an external system central processing unit (CPU) as a result of CPU processing, said data transfer controlling device comprising:

a transfer number storing means for storing a value specifying the number of DMA transfers to be executed in response to each DMA transfer request of the plurality of DMA requests;

a transfer number updating means for changing the value stored in said transfer number storing means at each execution of a DMA transfer;

a data setting means for automatically resetting the value stored in said transfer number storing means after each DMA transfer request is made of said plurality of DMA requests to allow processing of a subsequent DNA transfer request without interruption of CPU processing;

a terminal position counter for storing a value specifying the size of the DMA transfer source region in which data is stored to be DMA-transferred;

a terminal position counter updating means for automatically changing the value stored in said terminal position counter;

an address storing means for storing an address value specifying data stored in said DMA transfer source region;

an address updating means for automatically updating the value of said address storing means after each execution of a DMA transfer;

a detecting means for detecting whether all of the data stored in the DMA transfer source region has been transferred; and a DMA execution control means for stopping DMA transfer on the basis of the result of such detection by said detecting means, wherein, after the initial DMA request, the DMA transfers responsive to said plurality of DMA requests are performed automatically and without interruption of CPU processing.

4. A direct memory access (DMA) controller for controlling access of a memory by a peripheral device, said memory having at least one DMA source region comprising at least one area, said area having at least one block of data to be DMA transferred to said peripheral device under control of the DMA controller in response to a plurality of DMA requests after an initial DMA request, said memory storing in said source region data received from an external system central processing unit (CPU) as a result of CPU processing, the DMA controller comprising:

a memory address register (MAR) storing an address value specifying a block of data in said DMA source region;

a down counter (DC) storing a value specifying the number of blocks not yet DMA transferred from an area of said source region that is subjected to DMA transfer;

a terminal counter (TC) storing a value specifying the number of blocks in said DMA source region not yet DMA transferred from said DMA source region subjected to DMA transfer in, response to said plurality of DMA requests; and a DMA control section receiving a DMA transfer request of said plurality of DMA requests and implementing a DMA transfer of a block of data stored in said DMA source region corresponding to the address stored in said MAR, wherein after said DMA transfer is executed, said MAR stores an address value corresponding to a subsequent block of data in said DMA source region, and said DC stores a decremented value to compensate for the block of data thus transferred, and wherein said DMA control section automatically implements subsequent DMA transfers in response to subsequent transfer requests based on values stored in said MAR, said DC, and said TC until the value stored in said TC indicates that no more blocks of data are to be DMA transferred from said source region, said automatic implementation being performed without interruption of CPU processing after the initial DMA request.

5. The DMA controller of claim 4, further comprising:

a TC decrementer, coupled to said TC, used to decrement the value stored in said TC;

a DC decrementer, coupled to said DC, used to decrement the value stored in said DC and replace the stored value with the value thus decremented; and a pointer updating device, coupled to said MAR, used to update the address value stored in said MAR to correspond with the successive block of data in the DMA source region that is to be DMA transferred after each DMA transfer is executed by said DMA control section.

6. The DMA controller of claim 5, wherein the value stored in said TC corresponds to the area in said DMA source region subjected to DMA transfer, and when said TC decrementer decrements the value stored in said TC to zero, said DMA control section inhibits DMA transfer from said DMA source region subjected to DMA transfer.

* * * * *

UNITED STATES PATENT AND TRADEMARK OFFICE
CERTIFICATE OF CORRECTION

PATENT NO. : 5,561,816
DATED : October 1, 1996
INVENTOR(S) : Yuko Mitsuhira, et al.

It is certified that error(s) appears in the above-identified patent and that said Letters Patent is hereby corrected as shown below:

Column 1, line 22, delete "the rate of the data of" and insert --a rate of--; delete "in response to one" and insert --per--;

line 24, delete "executed in" and insert --executed by--; after "routine" insert --executed by the CPU--;

line 28, before "thereby" insert --and--; delete "to";

line 48, delete "corresponding" and insert --each corresponding to--;

line 63, after "including" delete "a"; after "511" delete "and" and insert --, --;

line 66, before "several" insert --and--; delete "them" and insert --such components--.

UNITED STATES PATENT AND TRADEMARK OFFICE
CERTIFICATE OF CORRECTION

PATENT NO.    : 5,561,816
DATED         : October 1, 1996
INVENTOR(S)   : Yuko Mitsuhira, et al.

It is certified that error(s) appears in the above-identified patent and that said Letters Patent is hereby corrected as shown below:

Column 2,   line 2,    after "500" insert --in a manner well known in the art--;

line 5,    delete "right" and insert --write--;

line 26,   before "DMA" delete "a" insert-- and--delete "region A 530 and a" and insert --regions A and B (530)--;

line 27,   delete "DMA transfer source region B 531, and" and insert --The memory 503--;

line 33,   delete "530";

line 34,   after "data" insert --(i.e., all the data to be transferred)--; delete "530)";

line 36,   delete "530";

line 38,   delete "530";

line 40,   delete "for" and insert --from--; delete "530";

UNITED STATES PATENT AND TRADEMARK OFFICE
CERTIFICATE OF CORRECTION

PATENT NO. : 5,561,816
DATED : October 1, 1996
INVENTOR(S) : Yuko Mitsuhira, et al.

It is certified that error(s) appears in the above-identified patent and that said Letters Patent is hereby corrected as shown below:

Column 2, line 42, delete "531"; before "After" insert --This data may be data from an external peripheral such as the host computer in the example above--;

line 43, delete "530";

line 44, delete "531";

line 45, delete "531" and insert --by the CPU 511--;

line 46, delete "530"; delete "531";

line 62, delete "530".

Column 3, line 6, delete "530";

line 15, after "512" insert --then--;

line 17, delete "by the" and insert --a--;

line 19, delete "it" and insert --DMAC 512--;

line 33, before "from" insert --(i.e., A and B)--;

line 36, delete "time" and insert --interruptions--;

line 39, delete "regions is made" and insert -- region (i.e., A or B)--;

UNITED STATES PATENT AND TRADEMARK OFFICE
CERTIFICATE OF CORRECTION

PATENT NO. : 5,561,816
DATED : October 1, 1996
INVENTOR(S) : Yuko Mitsuhira, et al.

It is certified that error(s) appears in the above-identified patent and that said Letters Patent is hereby corrected as shown below:

Column 3, line 42, delete "531";

line 43, after "513" and insert --by the CPU 511--;

line 44, delete "531";

line 46, delete "531";

line 48, after "area" insert --and can continue with its program execution--;

line 56, before "recovering" insert --subsequently--.

Column 4, line 3, delete "this is remarkable" and insert --the effects of this delay are most noticeable--;

line 4, delete "this" and insert --such a--;

line 14, delete "until" and insert --before--;

line 17, after "areas" insert --because the CPU 511 will not yet have reset the address in MAR 513 to correspond to the next source area (e.g., B).--.

UNITED STATES PATENT AND TRADEMARK OFFICE
CERTIFICATE OF CORRECTION

PATENT NO.    : 5,561,816
DATED         : October 1, 1996
INVENTOR(S)   : Yuko Mitsuhira, et al.

It is certified that error(s) appears in the above-identified patent and that said Letters Patent is hereby corrected as shown below:

Column 5,  line 43,   delete "CPU 10" and insert --CPU 11--.

line 49,   after "buffer" insert --(not shown)--;

line 64,   after "pass" insert --as is well known in the art--.

Column 6,  line 21,   delete "on the side of" and insert --by the--;

line 23,   delete "regions A 30" and insert --region A 30--;

line 24,   delete "B31" and insert --region B31--;

line 43,   delete "CPU 11, after" and insert --After--;

line 44,   after "A 30" insert --, CPU 11--;

line 46,   after "A 30," insert --and initializes--;

line 47,   delete "("4" in FIG. 7)" and insert --("3" for the data blocks shown in each area depicted in FIG. 7)--;

line 50,   delete "4n" and insert --3n--; delete "of" (first occurrence);

line 59,   delete "the" and insert --additional received and--.

UNITED STATES PATENT AND TRADEMARK OFFICE
CERTIFICATE OF CORRECTION

PATENT NO. : 5,561,816
DATED : October 1, 1996
INVENTOR(S) : Yuko Mitsuhira, et al.

It is certified that error(s) appears in the above-identified patent and that said Letters Patent is hereby corrected as shown below:

| | | |
|---|---|---|
| Column 7, | line 1, | delete "for" and insert --to--; |
| | line 6, | delete "described" and insert --above--; |
| | line 13, | delete "A30" and insert --A 30--; |
| | line 16, | after "in" insert --or accepts--; |
| | line 17, | after "131" insert --(e.g., initially "3"); |
| | line 19, | before "is" insert --(e.g., "2")--; |
| | line 20, | after "121" insert --(e.g., initially "3n"); |
| | line 21, | before "by" insert --(e.g., 3n-1); |
| | line 24, | before "the" (second occurrence) insert --e.g.,--; |
| | line 28, | after "1" insert --as--; |

UNITED STATES PATENT AND TRADEMARK OFFICE
CERTIFICATE OF CORRECTION

PATENT NO. : 5,561,816
DATED : October 1, 1996
INVENTOR(S) : Yuko Mitsuhira, et. al.

It is certified that error appears in the above-indentified patent and that said Letters Patent is hereby corrected as shown below:

Column 7, line 29, delete "Thereafter" and insert --Similarly, thereafter--;

line 35, after "131." insert --The values stored in TC and MAR, however, are not reset. Thus, in the example above, the value in DC 131 is again "3", but the value in TC 121 is "3n-4".

Column 8, line 15, delete "in to" and insert --into--.

Signed and Sealed this

Sixth Day of May, 1997

Attest:

BRUCE LEHMAN

Attesting Officer

Commissioner of Patents and Trademarks